United States Patent [19]

Schwaiger et al.

[11] Patent Number: 5,038,627
[45] Date of Patent: Aug. 13, 1991

[54] VEHICLE TRANSMISSION WITH MANUALLY SHIFTED LOWER GEARS AND AUTOMATICALLY SHIFTED UPPER GEARS

[75] Inventors: Dennis D. Schwaiger; Kurt R. Baer, both of Toledo; Kenneth B. Yant, Oregon, all of Ohio

[73] Assignee: Dana Corporation, Toledo, Ohio

[21] Appl. No.: 514,426

[22] Filed: Apr. 25, 1990

[51] Int. Cl.$^5$ .................... F16H 59/70; F16H 59/74
[52] U.S. Cl. ................... 74/335; 74/473 P; 74/866
[58] Field of Search ............ 74/335, 336 R, 473 R, 74/866

[56] References Cited

U.S. PATENT DOCUMENTS

| | | | |
|---|---|---|---|
| 4,208,929 | 6/1980 | Heino et al. | 74/866 X |
| 4,414,863 | 11/1983 | Heino | 74/866 |
| 4,608,873 | 9/1986 | Redzinski | 74/336 R X |
| 4,722,248 | 2/1988 | Braun | 74/866 |
| 4,827,802 | 5/1989 | Marier | 74/335 X |

*Primary Examiner*—Dwight Diehl
*Attorney, Agent, or Firm*—MacMillan, Sobanski & Todd

[57] ABSTRACT

A vehicle mechanical transmission includes a conventional shift lever which enables the vehicle driver to manually select lower gear ratios, and an automatic shifting mechanism which provides automatic shifting between selected higher ratios once the driver has moved the shift lever to an "automatic" position. The transmission includes a plurality of shift rails which are individually and selectively moveable from a neutral position to two different gear positions. In accordance with the present invention, the shift lever is only coupled to mechanically shift a portion of the shift rails, typically those shift rails corresponding to the lower gear ratios. Once all the lower ratios have been selected, the driver can move the shift lever to an "automatic" position. When in this position, the shift lever actuates an electronic control, which in turn automatically controls the shifting of at least one shift rail in accordance with the status of various monitored vehicle operating parameters. In addition to a conventional interlock between each of the shift rails, an auxiliary interlock system is provided to prevent the shift lever from being moved to the automatic position simultaneously with the shifting of a manually actuated shift rail. Further, the transmission includes a driver actuated manual override valve to cause the automatically shifted rail to return to its neutral position in the event of failure of the automatic shifting mechanism.

8 Claims, 4 Drawing Sheets

VEHICLE TRANSMISSION WITH MANUALLY SHIFTED LOWER GEARS AND AUTOMATICALLY SHIFTED UPPER GEARS

BACKGROUND OF THE INVENTION

The present invention relates generally to a vehicle transmission of the mechanical type which includes an automatic shifting mechanism and, in particular, to a mechanical transmission wherein the lower gear ratios are manually selected by the vehicle driver, and wherein at least one of the upper gear ratios is automatically selected.

The majority of vehicle transmissions can generally be divided into two groups, "mechanical" transmissions and "automatic" transmissions. In its most common usage, an automatic transmission typically refers to a transmission which uses a torque converter and one or more planetary gear sets to achieve various predetermined output gear ratios. The automatic transmission is shifted by means of a plurality of hydraulically actuated clutch packs which are selectively engaged to lock components of the planetary gear sets relative to one another or to the transmission housing in order to achieve the desired gear ratio. On the other hand, a mechanical transmission, also referred to as a manual transmission, typically includes a gear train providing a plurality of various gear ratios which are manually selected by the vehicle driver, typically by disengaging an associated clutch, and then moving a gear shift lever to the desired gear position to cause the transmission to shift to the desired gear ratio.

While automatic transmissions offer advantages over mechanical transmissions in terms of convenience and less driver fatigue due to shifting, mechanical transmissions typically provide advantages over automatics with regard to cost, torque capacity, and fuel economy. As a result, the majority of medium and heavy duty truck transmissions are of the mechanical type. Mechanical transmissions can be further classified as either a single stage transmission, wherein all of the gear ratios available from the transmission are located within a single housing and are accessible by the driver via a single gear shift lever, or a compound transmission, wherein a single stage transmission functions as the main section of the transmission, and an auxiliary section is connected thereto to provide a plurality of additional ratios which, when combined with the ratios provided by the main section, enables the transmission to provide a larger number of gear ratios.

In order to improve the convenience of mechanical transmissions, various approaches have been proposed for automating or semi-automating the shifting of a conventional mechanical transmission. In these automated mechanical transmissions, the conventional driver operated shift tower is typically replaced by a hydraulically or pneumatically controlled automatic shifting mechanism, and an actuator is provided to automatically control the operation of the clutch.

It is also been proposed to provide a mechanical transmission wherein only a portion of the gear ratios are automatically selected. For example, the lower gear ratios can be manually selected by the vehicle driver, and the higher gear ratios can be automatically selected. Such an approach is advantageous in that the transmission is lower in cost than a fully automated mechanical transmission, yet offers automatic shifting in the upper highway range where the majority of shifting normally occurs. Thus, fuel economy is improved and driver fatigue is reduced.

U.S Pat. No. 4,722,248 discloses a compound transmission wherein only a portion of the gear ratios are automatically selected. In particular, in this patent, all of the gears of the main section of the transmission must be manually selected by the vehicle driver but, once the driver has manually shifted the main section into its highest ratio, sequentially related higher gear ratios provided by an auxiliary section are automatically shifted.

SUMMARY OF THE INVENTION

The present invention concerns an improvement to a conventional mechanical transmission wherein the lower gear ratios are manually selected by the vehicle driver via a conventional shift lever, and wherein at least one higher gear ratio is automatically selected once the driver has moved the shift lever to an "automatic" position. The invention is particularly adaptable to a single stage transmission which includes a plurality of shift rails which are individually and selectively movable from a neutral position to a gear position corresponding to a particular one of the available gear ratios. In most instances, two different gear ratios are selectable from each shift rail. As is conventional, a mechanical interlock is provided to enable only one of the shift rails to be moved from its neutral position at a time.

The transmission further includes a conventional driver-operated shift lever which extends downwardly into the transmission housing. In accordance with the present invention, the shift lever is only coupled to mechanically shift a portion of the shift rails, typically those shift rails corresponding to the lower gear ratios. These lower ratios are manually selected by the driver in a conventional manner. Once all the lower ratios have been selected, the driver can move the shift lever to the "automatic" position. This causes the lever to actuate an actuating means, such as an electric switch, to generate a signal to an electronic control indicating that the transmission has been placed in the automatic shifting mode.

The transmission includes at least one shift rail which is adapted to be automatically shifted, and provide at least two available gear ratios. This shift rail is moved by a shifting means such as a pneumatically actuated piston means which is controlled by solenoid actuated valves. The electronic control, which monitors various vehicle operating parameters such as engine speed, road speed, vehicle throttle position, and gear position, operates the valves to shift the rail between the two available gear ratios.

In order to generate the signal indicating the shift lever has been moved to the automatic position, the transmission includes a auto-shift block slidably mounted adjacent to one of the shift brackets associated with one of the manually shifted rails. To prevent simultaneous shifting of both the auto-shift block and the adjacent manual shift bracket, the transmission includes an auxiliary interlock mechanism which requires the shift lever to be completely disengaged from the adjacent manual shift bracket before the auto-shift block can be moved.

The transmission is further provided with a driver-operated manual override valve which, in the event of a failure in either the electronic control or the solenoid-actuated valves such that the transmission becomes locked in an automatic gear position, can be actuated to cause the automatically shifted rail to return to its neutral position, thereby returning manual control of the lower ratios to the vehicle driver.

In the preferred embodiment of the invention, the transmission is a single stage seven speed transmission wherein the first five gears are manually selected by the vehicle operator and the sixth and seventh gears are automatically shifted once the driver has moved the shift lever to the automatic position. It has been found that such an arrangement substantially reduces the number of shifts required by the vehicle driver once the vehicle has attained highway speed, and also results in improved fuel economy.

The above, as well as other advantages of the invention, will become readily apparent to one skilled in the art from reading the following detailed description of the invention in conjunction with the attached drawings.

DESCRIPTION OF THE PREFERRED EMBODIMENT

It should be noted at the outset of this description that the preferred embodiment of the present invention is described for use in conjunction with a single stage, seven speed transmission. However, it will be appreciated that the invention can also be utilized for single stage transmissions of different speeds, and also for compound transmissions wherein a single stage transmission functions as a main section and an auxiliary section such as a splitter or range unit is connected in series with the single stage transmission.

Figure 1:
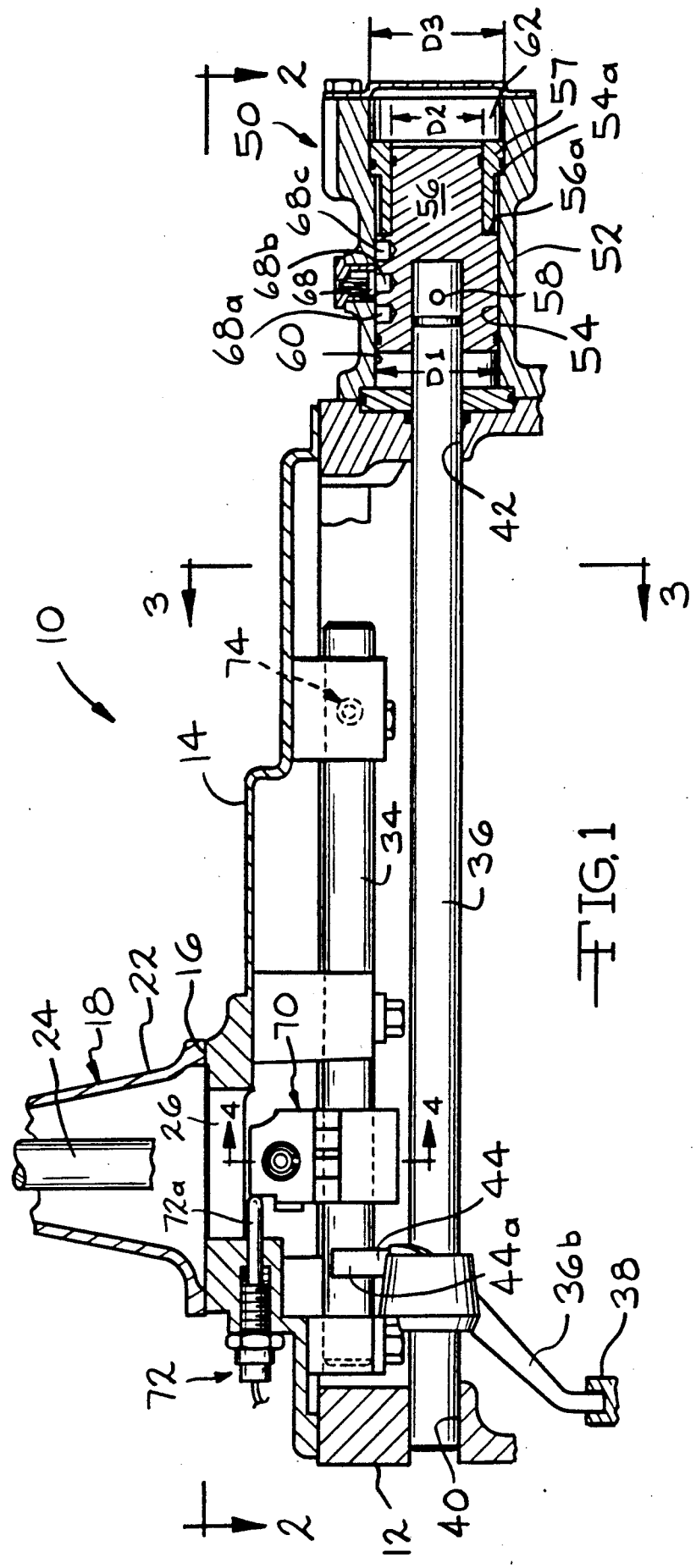
FIG. 1 is a fragmentary side sectional view through the top portion of a single stage 7-speed mechanical transmission incorporates the automatic shifting mechanism of invention.
Figure 2:
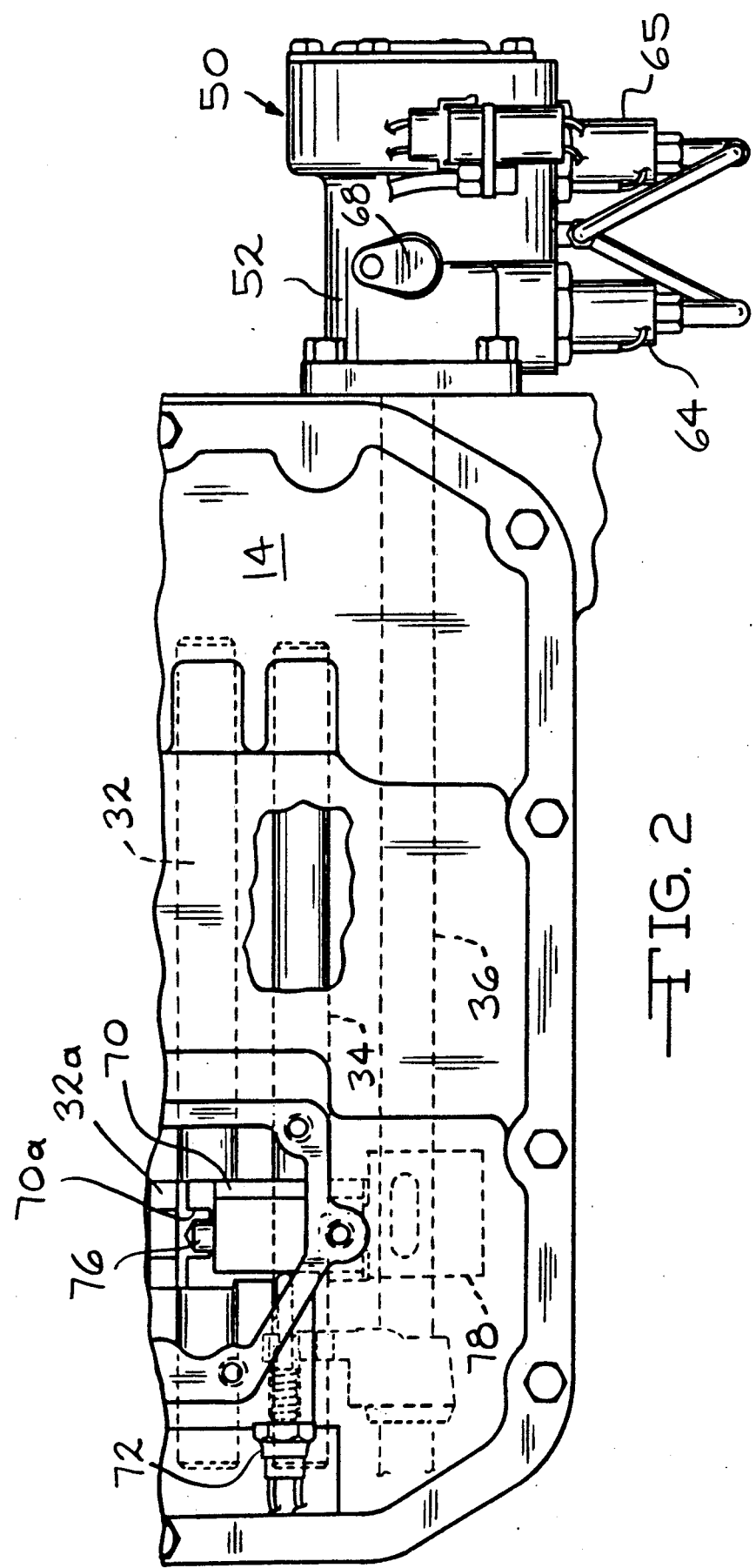
FIG. 2 is a fragmentary top plan view of the portion of the transmission taken along the line 2—2 of FIG. 1, and having the tower assembly removed from the top cover.
Figure 3:
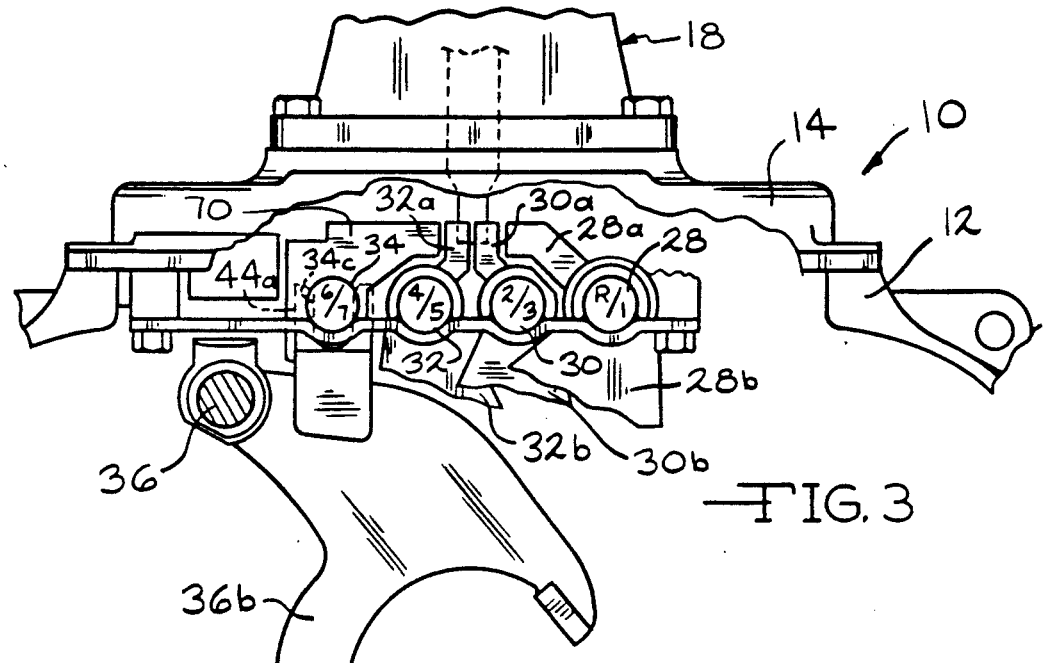
FIG. 3 is a fragmentary rear sectional view taken along the line 3—3 of FIG. 1 and illustrating the four main shift rails of the transmission along with an auxiliary shift rail to effect the automatic shifting between sixth and gears.
Figure 5:
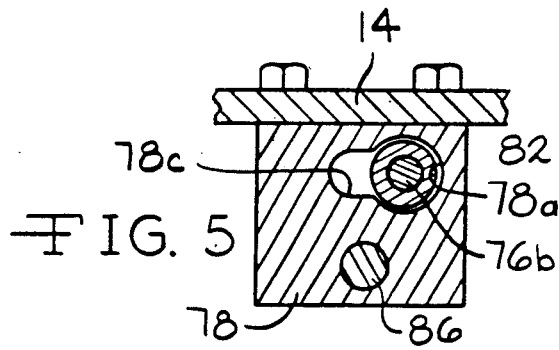
FIG. 5 is a sectional view taken along the line 5—5 of FIG. 4 and illustrating the structure of the auxiliary interlock used to prevent axial movement of the autoshift block until the associated spring loaded plunger has been fully compressed by the lower end of the gear shift lever.

Referring now to the drawings, and particularly to FIGS. 1, 2 and 3, there are shown fragmentary views of the upper portion of a single stage transmission 10 which incorporates the present invention. The lower portion of the transmission, which includes a gear train mounted on main and counter shafts, is conventional in structure and therefore not shown in the drawings. The transmission 10 includes an outer housing 12 having a top cover 14 secured thereto in a conventional manner. The top cover 14 defines a mounting pad 16 to which a conventional shift tower assembly 18 is secured. The shift tower assembly 18 includes an outer housing 22 for pivotly supporting a shift lever 24. The upper end of the shift lever extends upwardly into the vehicle cab, while the lower end of the shift lever 24 extends downwardly through an opening 26 in the top cover and, as will be discussed, engages the shifting components within the transmission.

The transmission 10 includes a plurality of shift rails carried by the top cover and supported for axial movement within the transmission housing. In particular, as shown in FIG. 3, an R/1 shift rail 28 is provided for shifting between reverse and first gears, a ⅔ shift rail 30 is provided for shifting between second and third gears, a 4/5 shift rail 32 is provided for shifting between fourth and fifth gears, and a 6/7 shift rail 34 is provided for shifting between sixth and seventh gears. Each of the shift rails 28, 30, 32, and 34 is axially moveable in a forward direction from a central neutral position to one of the two associated gear ratios and in a rearward direction to the other one of the two associated gear ratios.

Figure 7:
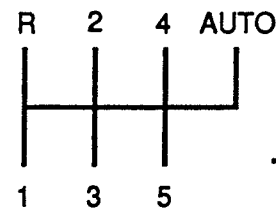
FIG. 7 is a schematic diagram illustrating the shifting pattern of the transmission shown in FIGS. 1-6.

In accordance with the present invention, the portion of the shift rails corresponding to the lower gear ratios are manually selected by the vehicle driver via the shift lever 24, while at least one of the shift rails associated with the higher gear ratios is automatically shifted once the shift lever has been moved to an "automatic" position. The automatic position is designated "AUTO" in the shifting pattern for the transmission which is illustrated in FIG. 7. In the preferred embodiment of the invention, the shift rails 28, 30, and 32 corresponding to gears one through five are all manually shifted, while the shift rail 34, which corresponds to the sixth and seventh gears, is automatically shifted. Each of the manually shifted shift rails includes a shifting bracket secured thereto which extends upwardly and is located adjacent to the other shifting brackets for engagement with the lower end of the shift lever. As shown in FIG. 3, shift brackets 28a, 30a, 32a are securely connected to the shift rails 28, 30, and 32, respectively. Further, each manual shift rail 28, 30, and 32 has a shift fork 28b, 30b, and 32b (shown only in FIG. 3), respectively, secured thereto which extends downwardly and is coupled to an associated shifting collar (not shown) on the gear train to effect shifting of the transmission when the associated shift rail is shifted forwardly or rearwardly.

As mentioned above, the 6/7 shift rail 34 is adapted to be automatically shifted. In the transmission shown in FIGS. 1—3, due to space limitations, the automatic shifting means could not be connected directly to the shift rail 34. Accordingly, an auxiliary shift rail 36, which is laterally and downwardly spaced from the 6/7 shift rail 34, is provided to effect the automatic shifting. The auxiliary shift rail 36 includes a 6/7 shifting fork 36b which extends downwardly and is coupled to a 6/7 shifting collar 38 (shown in FIG. 1). The auxiliary shift rail 36 is mounted for axially slidable movement within the transmission housing at its front end within an aperture 40 provided in the front of the transmission housing, and at its rear end within an aperture 42 provided at the rear of the transmission housing. The auxiliary shift rail 36 and its associated shifting fork 36b are secured to the main 6/7 shift rail 34 for axial movement therewith by means of a connecting bracket 44 having a lower portion secured to the shifting fork 36b and having a U-shaped upper portion which is received within a slot 34c (shown in FIG. 3) formed in the 6/7 shift rail 34. Thus, axial movement of the auxiliary shift rail 36 causes corresponding axial movement of the main 6/7 shift rail 34.

The auxiliary shift rail 36 is axially shifted by means of a pneumatically operated shifting mechanism, generally represented by the reference numeral 50, and secured to the rear wall of the transmission housing, as shown in FIGS. 1 and 2. The shifting mechanism 50, which is best shown in FIG. 1, includes an outer housing 52 which defines an inner cylindrical bore 54 for receiving a piston 56. The piston 56 is secured to the rear end of the auxiliary shift rail 36 by means of a cross pin 58. The piston 56 and the cylindrical bore 54 cooperate to define a front air chamber 60 and a rear air chamber 62. The piston 56 has a front end formed of a diameter D1, and a rear end formed of a smaller diameter D2. A sleeve 57 surrounds the rear end of the piston and includes an enlarged rear end formed of a diameter D3 and engageable with an annular shoulder 54a of the bore 54. The front end of the sleeve 57 is engageable with an annular shoulder 56a formed on the piston to locate the piston in a neutral position as shown in FIG. 1. The diameters D1, D2, and D3 are chosen such that, when pressurized air is supplied to both chambers 60 and 62, the piston 56 will be urged to its neutral position. The relative pressures in the chambers 60 and 62, which control the axial shifting movement of the auxiliary shift rail 36, are controlled via a pair of solenoid-actuated valves 64 and 65 as shown in FIG. 2, and as will be discussed in more detail hereinafter. A gear position sensor 68, which can be a Hall effect device is mounted on the top of the piston housing and senses whether the shift auxiliary rail is in a neutral position, or a sixth or seventh gear position, by monitoring the polarity of magnets 68a, 68b, and 68c carried by the piston 56 as they become positioned immediately below the sensor. Typically, the magnet 68b will provide one polarity to the sensor, while the magnets 68a and 68c will provide an opposite polarity.

As previously mentioned, the transmission enters the automatic shifting mode when the driver manually positions the shift lever in the automatic position. In order to signal an electronic control (shown in FIG. 8 at 71) that the shift lever has been moved to its automatic position, an auto-shift block, generally represented by the reference numeral 70, is slidably supported adjacent the manually actuated 4/5 shift bracket 32a. In the preferred embodiment of the invention, the auto-shift block 70 is slidable on the main six/seven shift rail 34. However, it will be appreciated that other means can be utilized to slidably mount the block 70. The block 70 is provided with a notch 70a for engagement with the lower end of the shift lever. In its neutral position, the shift block 70 engages an axially moveable, spring loaded member 72a of an electric switch 72 to maintain the switch in an unactuated state. When the shift lever is moved to the upper right "AUTO" position as represented in the shifting pattern of FIG. 7, the block will be moved rearwardly along the six/seven shift rail. When the block is moved rearwardly to its automatic position, the switch member 72a will extend to actuate the switch 70 and signal the electronic control 71 that the driver has placed the transmission in the automatic shifting mode.

As is conventional, the transmission is provided with a mechanical interlock which prevents movement of more than one of the shift rails from its neutral position at a time. This interlock system is generally represented in FIG. 1 by the reference numeral 74. The structure of this interlock is conventional, and can be of the type illustrated and described in U.S. Pat. No. 4,550,628, which is herein incorporated by reference. However, since the auto-shift block 70 is not secured to the 6/7 shift rail 34, but is slidably mounted thereon, movement of the shift lever to the automatic position could conceivably also shift the adjacent manual shift bracket 32a into fourth gear at the same time, if the gear shift lever bridges the gap between the manual shift bracket and the auto shift bracket. For this reason, the transmission of the present invention incorporates an auxiliary interlock mechanism which prevents the adjacent manual shift bracket 32a from being shifted to the fourth gear position simultaneously with the shifting of the auto-shift block 70 to the automatic position.

Figure 4:
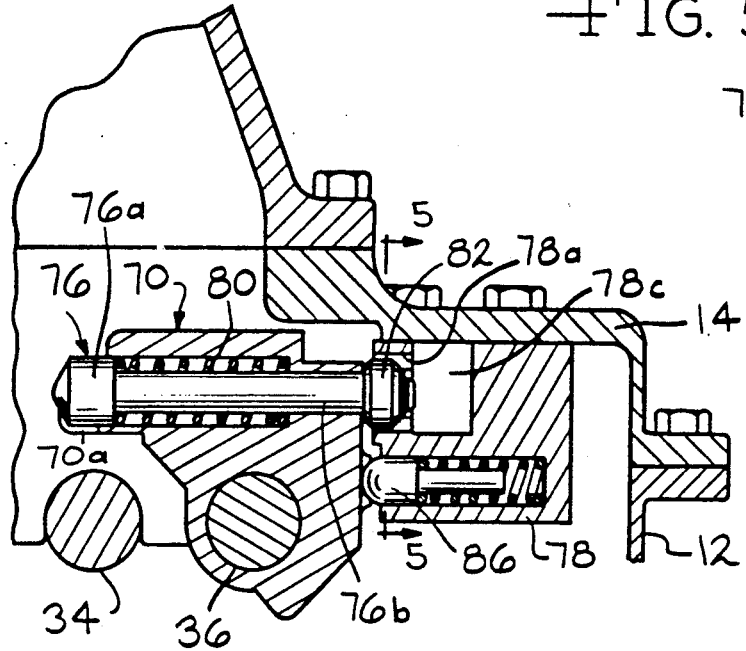
FIG. 4 is a sectional view taken along the line 4—4 of FIG. 1 and illustrating the auxiliary interlock mechanism which prevents the gear shift lever from simultaneous shifting the into both a manually selected gear and an shifting mode.
Figure 6:
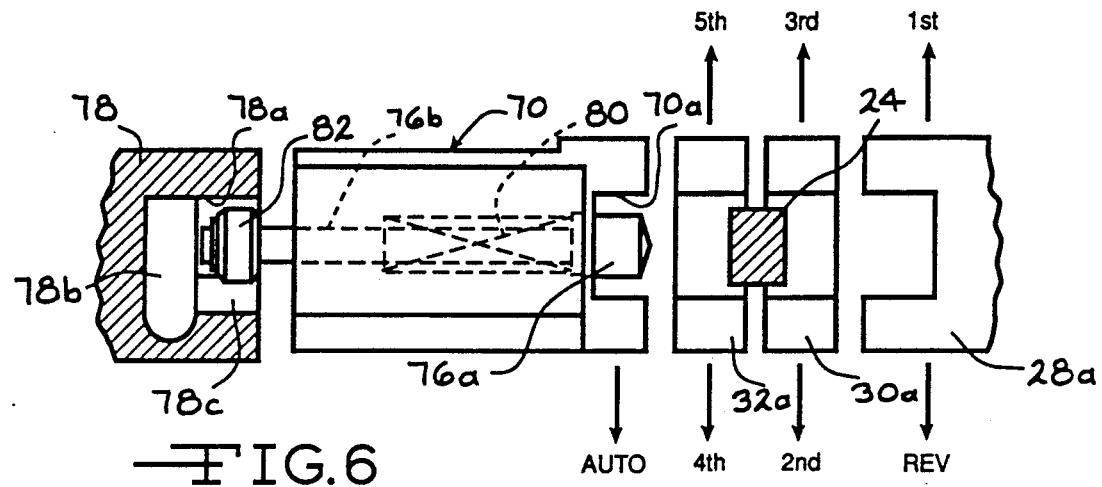
FIG. 6 is a top plan view taken generally along the line 6—6 of FIG. 3 and illustrating the manner in which the lower end of the gear shift lever selectively engages the individual manually actuated shift brackets or the auto-shift block.

This interlock function is accomplished by the use of a spring loaded plunger 76 incorporated in the auto-shift block 70, and an auxiliary interlock block 78 secured to the top cover 14, as shown best in FIGS. 4 and 6. In particular, the spring loaded plunger requires that the lower end of the shift lever be completely inserted within the notch 70a of the auto-shift bracket 70 prior to permitting any axial movement of the auto-shift block. The plunger 76 includes an enlarged end 76a which is normally biased outwardly into the notch 70a by a spring 80. The opposite end of the plunger 76 has an enlarged ring 82 secured thereto which is normally received within a circular opening 78a formed in the auxiliary interlock block 78. In the position shown in FIG. 4, the enlarged ring 62 is located immediately within the circular opening 78a formed in the block, which prevents any axial movement of the auto-shift block 70 along the shift rail 34.

When the lower end of the shift lever is moved completely within the notch 70a, the enlarged ring 82 on the plunger will be received within an elongated cavity 78b formed in the block. This enables the auto-shift block 70 to be shifted rearwardly such that the plunger shaft 76b is received within an axially extending slot 78c formed in the block having a width greater than the diameter of the shaft, but less than the diameter of the ring 82. The distance that the plunger must be moved is chosen to ensure that the lower end of the shift lever is completely inserted within the notch 70a and has been moved completely out of engagement with the manual shift bracket 32a. In addition to providing a means for locking the auto shift block, the auxiliary interlock block also incorporates a spring loaded detent pin 86 which engages one of two recessed portions 70c and 70d (shown in FIG. 1) formed on the side wall of the auto-shift block to locate the shifting block in either its neutral position or its automatic position.

Figure 8:
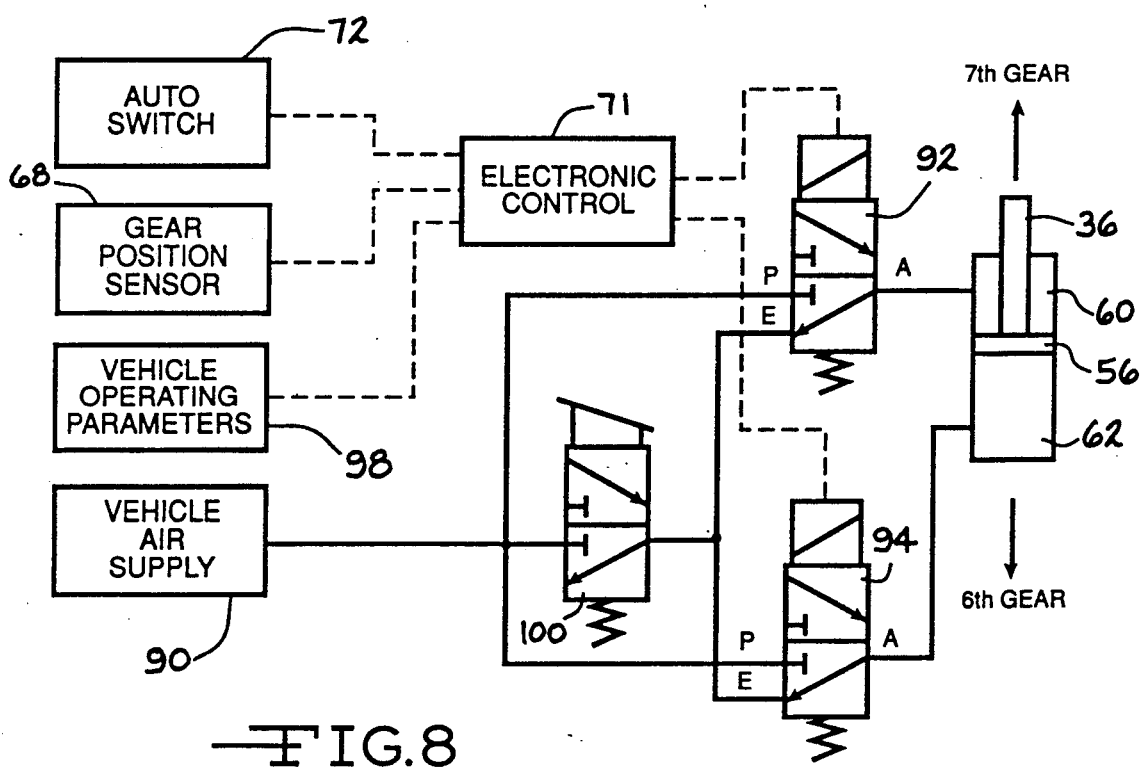
FIG. 8 is a pneumatic/electric schematic illustrating the control system utilized to operate the automatic shift mechanism of the transmission.

Referring now to FIG. 8, there is shown a combined electric/pneumatic schematic drawing generally illustrating the control of the present invention. In FIG. 8, electrical connections are indicated by dashed lines, while pneumatic connections are shown as solid lines.

As a general rule, the transmission can utilize the vehicle air supply 90 as a source of pressurized fluid for effecting the shifting of the auxiliary shift rail 36. A normally closed three-way valve 92 is connected between the vehicle air supply 90 and the front air chamber 60 and is actuated in the event it is desired to shift the transmission to sixth gear, and a second normally closed three-way valve 94 is connected between the vehicle air supply 90 and the rear air chamber 62 and is actuated in the event it is desired to shift the transmission to seventh gear. Simultaneous actuation of both the valves 92 and 94 applies pressure to both sides of the piston to cause the shift rail 36 to be shifted to the neutral position. The valves 92 and 94 are controlled from signals received from the electronic control 71 which, in addition to inputs received from the auto switch 72 and the auto gear position sensor 68, is also connected to receive signals from various other vehicle operating parameters, such as, for example, engine speed, vehicle road speed, and throttle position as represented by the block 98. When the electronic control receives a signal from the auto switch 72 indicating that the driver has placed the transmission in the automatic shifting mode, the electronic control will then selectively actuate the valves 92 and 94 to shift the transmission between sixth and seventh gears in accordance with predetermined vehicle operating parameters.

In the event of a failure of one of the solenoid actuated valves or the electronic control system, it is possible that the transmission may become locked in either the sixth or seventh gears. In this case, due to the main interlock mechanism, the driver would be unable to manually shift the transmission into one of the lower gear ratios. To solve this problem, the present invention incorporates a driver actuated override valve 100 connected between the vehicle air supply 90 and the exhaust ports of each of the solenoid actuated valves 92 and 94. Normally, the override valve 100 has no effect on the automatic shifting operation, since the exhaust ports of the solenoid actuated valves 92 and 94 are both vented through the exhaust port of the override valve 100. However, in the event of a failure condition which causes the transmission to be locked in either sixth or seventh gears, the override valve 100 can be manually actuated by the vehicle driver to cause the vehicle air supply 90 to be connected to the exhaust ports of both solenoid valves. Thus, regardless of the position of the solenoid valves, pressurized air will be supplied to both the front and rear chambers 60 and 62, and thereby cause the piston to be shifted to its neutral position. At this point while the automatic gear ratio will be unavailable, the driver can manually shift the transmission between the lower five gear ratios.

The transmission of the present invention has been illustrated and described in what is considered to represent its preferred embodiment. However, it will be appreciated that various modifications can be made to the specific structure disclosed herein without departing from the scope of the attached claims.

What is claimed is:

1. In a vehicle transmission including a housing containing a gear train and a shifting means for shifting the transmission between a plurality of gear ratios, said shifting means comprising:

a plurality of shift rails supported for shiftable movement within said housing, each of said shift rails being moveable from a neutral position to a gear position to shift the transmission into a particular one of the plurality of gear ratios;

a driver actuated gear shift lever extending into said housing and moveable from a neutral position to a plurality of gear positions;

said gear shift lever engagable and moveable with at least one of said shift rails to shift said transmission to a first gear ratio when said gear shift lever is moved from the neutral position to a first gear position;

an actuating mechanism coupled to said gear shift lever and operable to generate a shift signal when said gear shift lever is moved from the neutral position to a second gear position; and means independent of said gear shift lever and coupled to at least another one of said shift rails, said means responsive to said shift signal for moving said other one of said shift rails to shift the transmission to a second gear ratio.

2. The vehicle transmission according to claim 1 wherein said actuating mechanism includes an auto-shift block mounted for axially shiftable movement alongside said shift rails, said gear shift lever engageable with said auto-shift block to move said block from a neutral position to an auto position when said gear shift lever is shifted from a neutral position to an automatic position, said actuating mechanism operable to generate said shift signal when said block is moved to the automatic position.

3. The vehicle transmission according to claim 2 including a main interlock mechanism coupled to each of said shift rails to permit only one of said shift rails to be moved from its neutral position at a time.

4. The vehicle transmission according to claim 3 wherein said block is positioned adjacent to a shift bracket attached to a manual shifted rail, and including an auxiliary interlock means coupled to said block for preventing both said auto-shift block and said adjacent shift bracket from being moved from a neutral position at the same time.

5. The vehicle transmission according to claim 2 wherein said block is slidably mounted on said other one of said shift rails.

6. The vehicle transmission according to claim 1 wherein said means for moving said other shift rail includes a fluid actuated shifting means connected to axially shift said other one of said shift rails.

7. The vehicle transmission according to claim 6 wherein said fluid actuated shifting means is operable to shift said other shift rail between neutral, second, and third gear positions, and further comprising a shift control means including a supply of pressurized fluid, an electronic control means responsive to said shift signal for generating first and second control signals; and a solenoid valve means responsive to said first control signal for controlling said supply of pressurized fluid to said fluid actuated shifting means to move said other shift rail to said second gear position, and responsive to said second control signal for controlling said supply of pressurized fluid to said fluid actuated shifting means to move said other shift rail to said third gear position.

8. The vehicle transmission according to claim 7 wherein said fluid actuated shifting means includes a manually operable override valve which, when actuated, controls the supply of pressurized fluid to said fluid actuated shifting means to move said other one of said shift rails to said neutral position regardless of the status of said first and second control signals.

* * * * *